No. 676,920. Patented June 25, 1901.
C. C. SCHREIBER.
BOTTLE CLEANING MACHINE.
(Application filed Mar. 9, 1901.)
(No Model.) 3 Sheets—Sheet 1.
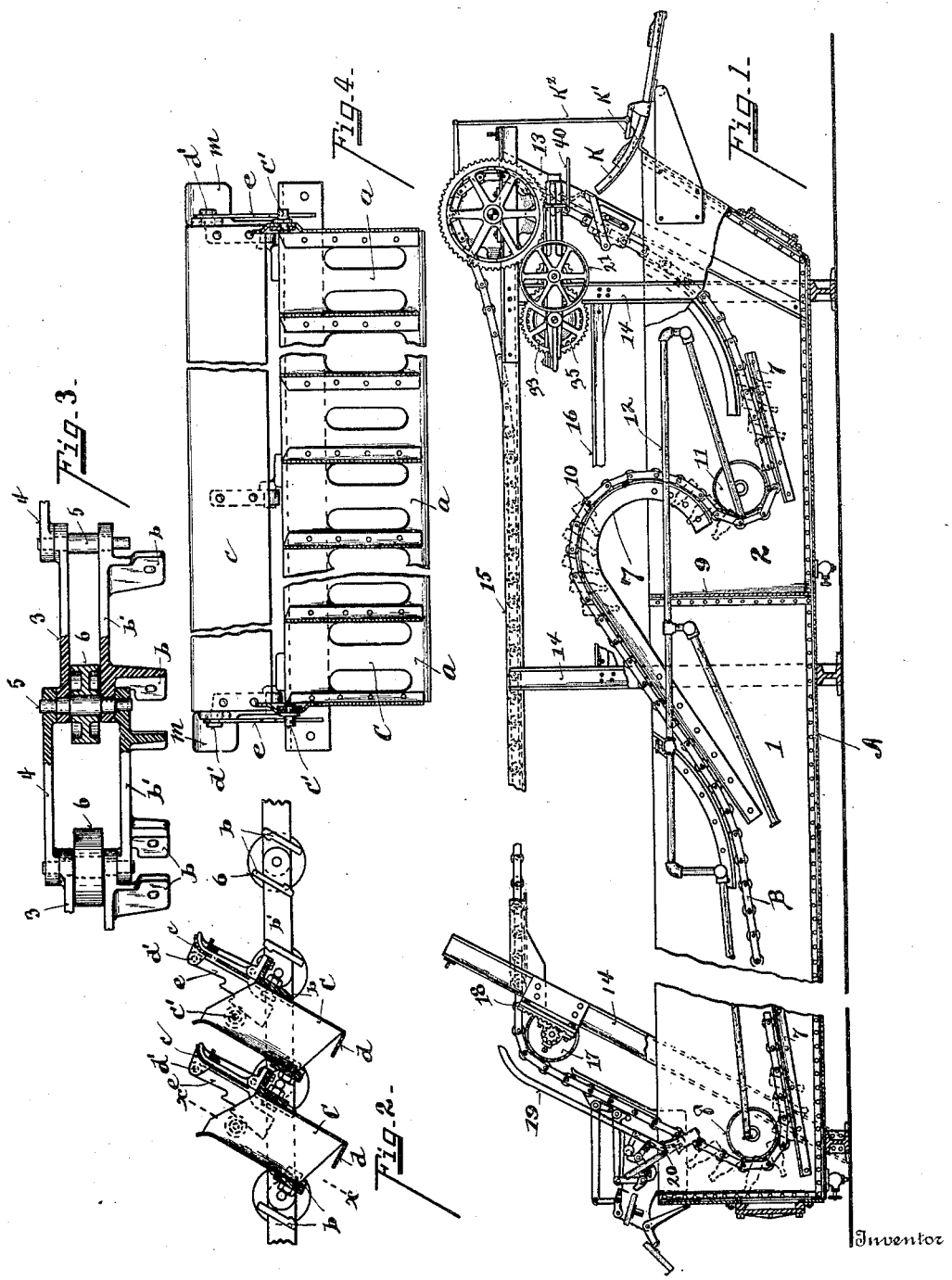

No. 676,920. Patented June 25, 1901.
C. C. SCHREIBER.
BOTTLE CLEANING MACHINE.
(Application filed Mar. 9, 1901.)
(No Model.) 3 Sheets—Sheet 2.
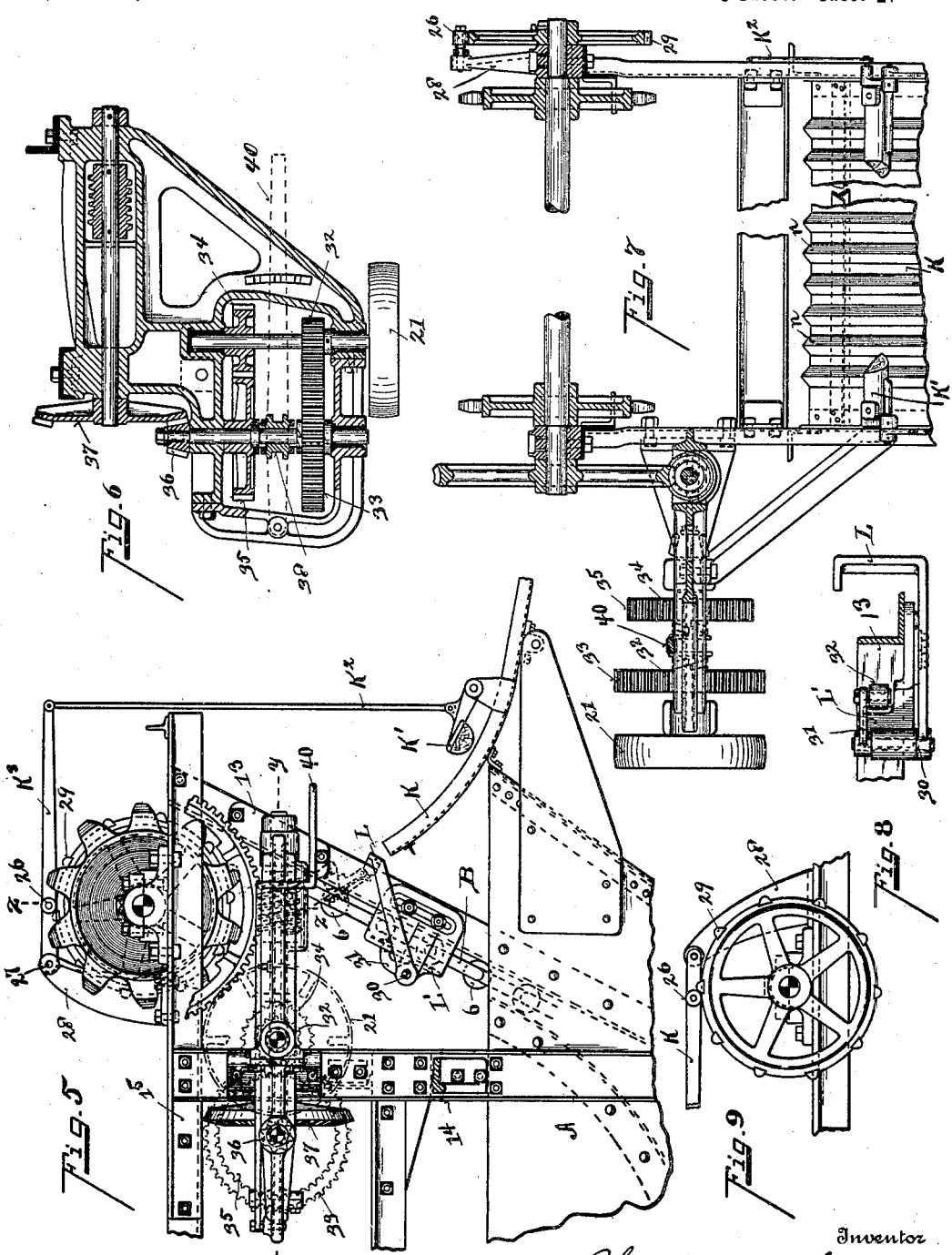
Witnesses
Oliver B. Kaiser
Pearl McMichael
Inventor
Charles C. Schreiber
By Wood & Wood Attorneys No. 676,920. Patented June 25, 1901.
C. C. SCHREIBER.
BOTTLE CLEANING MACHINE.
(Application filed Mar. 9, 1901.)
(No Model.) 3 Sheets—Sheet 3.
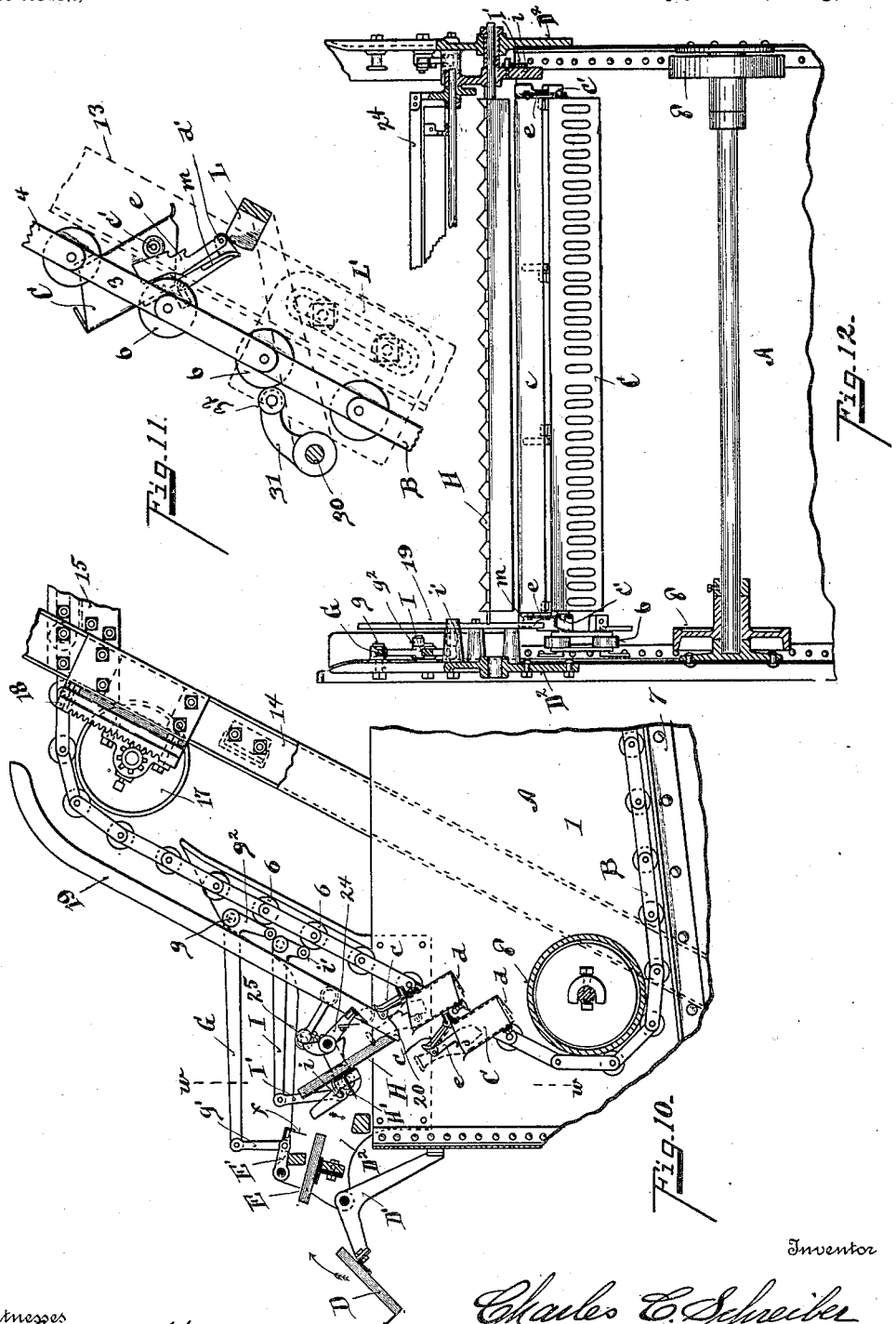
Witnesses
Oliver B. Kaiser
Pearl McMichael
Inventor
Charles C. Schreiber
By Wood & Wood
Attorneys

UNITED STATES PATENT OFFICE.

CHARLES C. SCHREIBER, OF CINCINNATI, OHIO.

BOTTLE-CLEANING MACHINE.

SPECIFICATION forming part of Letters Patent No. 676,920, dated June 25, 1901.

Application filed March 9, 1901. Serial No. 50,470. (No model.)

*To all whom it may concern:*

Be it known that I, CHARLES C. SCHREIBER, a citizen of the United States, residing at Cincinnati, in the county of Hamilton and State of Ohio, have invented certain new and useful Improvements in Bottle Cleansing and Pasteurizing Machines, of which the following is a specification.

My invention relates to an apparatus which is adapted for either pasteurizing, washing, or soaking and rinsing bottles.

One of the objects of my invention is to employ a bottle-support having a swinging lid and means for locking it in position, so that the bottles may be inverted during their travel through the tank or tanks in which the cleansing solutions are held.

Another object of my invention is to provide appropriate means for reversing the position of the bottles during their travel through the tank or tanks, so that they may be filled and emptied automatically of the solution or solutions held in the tank.

Another object of my invention is to provide a primary feeder on which a series of bottles are placed by the attendants and delivered to an automatic feeder, which is operated by an endless carrier.

Another object of my invention is to provide bottle-holders mounted on an endless carrier adapted to hold one or more bottles and used in connection with an automatic feeder operated by an endless carrier, which carries the supports, so that the bottle-holders may be filled with empty bottles at appropriate time movements and operated by the endless carrier.

Another object of my invention is to provide an endless carrier having bottle-holders mounted thereon, means for locking said bottles in the holders, and means for elevating and depressing the endless carrier during its travel through the tank, so as to reverse the end position of the bottles and fill and empty the same.

Another object of my invention is to provide in connection with the endless carrier means for reversing the position of the bottles in a tank having plural compartments and means for filling and reversing the bottles in each of said tanks by means of the elevating and depressing mechanism for controlling the direction of the endless-carrier travel, so as to fill and empty the bottles successively in each tank, as desired.

Another object of my invention is to provide an automatic discharging mechanism at the rear end of the tank, whereby the series of bottles held in the bottle-holders mounted on the endless carrier may be discharged at the appropriate time without the necessity of an attendant to remove the bottles from their holders.

The various other features of my invention are more fully set forth in the description of the accompanying drawings, forming a part of this specification, in which—

Figure 1 is a longitudinal central section of my improved apparatus. Fig. 2 is an enlarged elevation of a section of the endless carrier and bottle-holders. Fig. 3 is an enlarged top plan view of a section of one of the carrier-chains. Fig. 4 is a section of the bottle-holder on line $xx$, Fig. 2. Fig. 5 is a side elevation of the discharging end of the tank. Fig. 6 is a section on line $y y$, Fig. 5. Fig. 7 is a section on line $z z$, Fig. 5. Fig. 8 is a detail view of the trip-discharging mechanism. Fig. 9 is a detail view of the automatic discharging-brake. Fig. 10 is an end elevation, partly in section, of the automatic feeding devices. Fig. 11 is a detail view of the locking and tripping mechanism for discharging bottles out of their holders. Fig. 12 is an elevation, partly in section, on line $w w$, Fig. 10.

In the accompanying drawings I have shown the tank which contains the bottle soaking or pasteurizing solutions, having a single partition and two compartments. Of course one or more compartments may be used, as desired. I have also shown mechanism for carrying and reversing the position of the bottles in each compartment. The following are the principal features of the same:

A represents the tank, in which any desired solutions may be employed. 1 2 show the separate compartments thereof.

B represents the endless carrier, which I prefer to construct of two chains composed of links 3 4, hinged together by center 5.

6 represents friction-rollers on center 5, which travel on ways 7, said ways being preferably rigidly connected to the sides of the tanks.

C represents bottle-holders, which are provided with a hinged lid $c$, which is constructed and operated as will be hereinafter explained. These bottle-holders are connected to the ears $b\ b$ of the links $b'$. The said bottle-holders are provided with pockets with partitions between them, so as to hold the bottles in place. I have shown the sections of the chain on one side. Of course the chain on the opposite side of the tank is a counterpart thereof. In the drawings, Fig. 4, I have shown a few bottle cavities or pockets in bottle-holder $a$. There may be as many cavities for carrying any desired number of bottles in a series of bottle-holders as desired. The bottles are placed in said cavities, as will be hereinafter explained, and as the endless carrier depends into the tank 1 it is caused to pass over the sheaves 8, attached to the sides of the tank, the fluid in the tank rising above the said sheave. The carrier passes over said sheave and thence upon the ways 7, thence upward over the partition 9, traveling on ways, which are depressed to reverse the position of the bottles, as shown at 10, thence over the depressing-sheave 11, thence up the inclined ways 7 at the rear end of said tank, passing out of said tank, and thence to the discharging mechanism hereinafter explained.

12 represents a heating-pipe for controlling the temperature of the tank.

13 14 15 16 represent the framework of the tank, which is inclosed by suitable side and end pieces as desired, which are preferably made of metal and secured to the framework by appropriate fastening devices.

17 represents a carrier-sheave mounted upon a shaft, which carries pinions meshing with rack-bar 18 for adjusting the said shaft to increase or diminish the distance between the two sheaves, and thereby controlling the tautness of the endless carrier.

The bottle-holders are rigidly connected to the chain-links, so that their position in the tank and the bottles therein are controlled vertically by the direction of the carrier travel.

$d$ represents the bottom of a fixed support, on which one edge of the bottle rests. I have shown simply a sectional bottom for the purpose of allowing the labels which are washed off to be readily discharged therefrom. Perforated holders and bottoms may be used.

$c$ represents the hinged lid, which forms the cover and support of a series of bottles in a given holder when they are in a reverse position in the tank. It is essential that this lid be held in position when the bottles are reversed in the tank and be open for discharging the bottles from the holders. To accomplish this, I provide a pawl $e$, hinged to the top end of the lid at $d'$, as shown in Fig. 2.

$m$ represents the end projections of the lids.

The bottle-holders approach the charging apparatus with their lids thrown back by the action of the discharging mechanism. As they pass over the sheave 17, the upper edges of the lids come in contact with the guide-bar 19, which is attached to the sides of the tank, one being used on both sides, if desired. They are held in this position until they arrive at the point 20, where they receive the bottles from the charging mechanism.

The charging mechanism I prefer to make in the following manner, (see Fig. 10:)

D represents a primary charging chute-shelf mounted upon a hinged support D', which turns on a center secured to the side plate $D^2$, which is simply a frame extension of the tank. This primary chute-shelf is preferably employed, though not absolutely essential to the operation of my device. It is a very convenient means, as from ten to twenty bottles may be placed in the bottle-holder, the attendant having to fill said shelf and then deposit the same upon a secondary chute-shelf E by simply swiveling the support D', which brings the shelf D up in line with chute-shelf E. In order that the bottles may be held upon the chute-shelf E until the appropriate time, I provide a lever E' preferably on each side, having a depending wing $f$ secured thereto.

G represents a trip-lever hinged by center $g$ to the upright support $D^2$.

$g'$ represents a link connection with the lever E'.

$g^2$ represents a depending-arm on lever G, carrying a friction-roller, against which the rollers 6 of the endless carrier come in contact at the appropriate time and lift the lever E' and wing $f$, so as to allow the bottles to slide off of the inclined charging chute-shelf E.

In order to deliver the bottles properly to the bottle-holders on the endless carrier, I prefer to interpose between the chute-shelf E and the bottle-holders an automatic charging device operated positively by lever mechanism. This consists of the swinging shelf H, rigidly connected to the bar H'.

I represents a tripping-lever having a link I', which is pivoted to the lever $i$ of the swinging shelf D. When the friction-roller $i'$ on the free end of the tripping-lever I is engaged with the friction-roller 6, the shelf is held in inclined position; but when said friction-roller $i'$ passes out of contact with roller 6 the chute-shelf H drops down into an inclined position in juxtaposition with the inclined chute-shelf E, from which the bottles pass by gravity down upon the vibratory chute-shelf H, which is immediately raised to the position shown in full lines, Fig. 10, when the bottles are delivered into the appropriate bottle-holders vertically underneath the same. These chute-shelves D, E, and H are preferably made of V angle-iron, so as to form an individual chute for each of the bottles, an elevation of which is shown in Fig. 12.

24 represents a stop-lever attached to the arm of the swinging shelf, the upper end of which engages with the stop 25 to arrest the upward movement of the inclined swiveling plate H. I am thus enabled to automatically fill the bottle-holders with any desired number of bottles automatically, as the endless carrier travels and brings the bottle-holders successively into position to receive the same.

*Discharging mechanism.*—It is desirable to provide suitable means for automatically discharging the bottles after they have passed out of the tank. As seen in Fig. 1, the bottles have their mouths downward and are emptied by gravity as they pass out of the tank. The discharging mechanism consists of the following instrumentalities:

K represents an inclined shelf upon which the bottles are delivered by the trip-discharging devices as the bottle-holders are successively emptied.

K' represents a brake mounted upon the tripping-lever $K^2$, which is operated by the tripping-arm $K^3$, which is provided with a roller 26 and hinged to a center 27 on the arm-support 28. This arm $K^3$ is actuated by the cam-teeth 29, which are so placed as to automatically lift the brake K' at the appropriate time for allowing the bottles which have been discharged onto the inclined chute-shelf K to pass down and off of the said shelf.

The tripping mechanism consists of devices arranged to open the swinging lid of the respective bottle-holders.

L, Fig. 8, represents a lever hinged to a plate L' on the center 30. The opposite end of said center carries the arm 31, on which is journaled a friction-roller 32. Said friction-roller comes in contact with the friction-roller 6 of the endless carrier and lifts the lever L, the bail portion of which comes in contact with the overlapping edge m of the lid d of the bottle-holder, and as the said lever is actuated it throws up said lid, thereby releasing the pawl e, (see Figs. 2 and 4,) which has been engaged with the pin c', which is attached to the outside of the bottle-holder or carrier. The lids are thrown back far enough to be held in their open position until the endless carrier has carried them forward, so that as they commence to descend from the sheave 17 over the front of the tank where a guide-bar is provided to still keep them open until after they have passed the charging mechanism. When they have arrived at this point and after they have received the bottles, the lids close by gravity and the catches on the pawl c engage with the pin c' and hold them in the closed position, and thus sustain them in a reversed position within the tank-compartments.

In order to accommodate the same bottle-holder to different-sized bottles, I have shown two catch-notches in the pawl c, as shown in Figs. 2 and 10. In the position shown in Fig. 10, a large bottle in position and the lower notch of the pawl in engagement with the catch-pins, the lid pressed against the bottle will prevent it from dropping out, keeping the mouth of the bottles open, allowing them to be filled when immersed beneath the liquid in the tank-compartments.

The driving mechanism may be of any appropriate construction. I have shown the same as being operated by pulley 21, gears 32 33 34 35, and bevel-gears 36 37. The gears 34 35 are multiplying-gears, which may be thrown in and out by the clutch 38, so as to change the speed of the driving mechanism or stop the same when the clutch is thrown into its central position by means of the clutch-lever 40.

The pipes for filling and discharging the liquid are the usual ones employed and may be of any well-known plan of construction.

It will be observed that the bottle-holders and the endless carrier opposite the charging apparatus travel downward at an angle slightly inclined from the vertical. This is done for two purposes, first, to bring the bottle-holders into the proper position to receive the bottles, which descend by gravity, and, second, to hold the bottles in approaching an upright position as they are carried beneath the liquid, as this position is essential to filling the same with the liquid. It will also be observed that the inclination at which the bottles pass out of the tank is in a reverse direction to the position in which the bottles are held while filling, so that they may be completely and thoroughly emptied before they pass out of the tank. It will also be observed that the inclined chute-shelf upon which the bottles are discharged is preferably provided with a series of partitions n, so as to form individual chutes for each of the bottles, which is necessary for their proper safe descent upon the discharging-shelf. These chute-shelves D, E, and H are likewise preferably made of V-iron or of corrugated form, so that each bottle is kept from contact with the other bottles in the series. The preferred form of construction is shown in Fig. 12, in which V-irons are secured to a common cross-arm.

I have shown my invention as primarily adapted to the soaking, rinsing of bottles, and filling and emptying the same with fluid. It is evident, however, that the same apparatus can be employed for pasteurizing the contents of sealed bottles.

Mode of operation: The lids of the bottle-holders are thrown back as they approach the charging mechanism and are held in the open position until they arrive opposite the swiveling shelf H at the point 20. The endless carrier operates the tripping mechanism for controlling the position of the swiveling charging-shelf H, so that in appropriate time movements it receives the bottles from the supporting chute-shelf E and transfers them into the bottle-holder C in a series. The lids of the bottle-holder are closed by gravity to hold the bottles in position as they pass the charging device and descend into the liquids in the tank, the bottles are filled as they pass beneath the liquid, and at the appropriate time they are carried up in a reverse position with the mouth downward, so as to discharge the liquid as they pass out of the tank. I have shown two tanks and two reversing mechanisms; but as many tanks and reversing devices for reversing the bottles may be employed as there are tanks, so that they may be successively filled and emptied with different kinds of liquids. After passing out of the last tank the bottle-holders approach the tripping mechanism, which opens the lid and allows the bottles to slide out through the bottom of the holder and pass on to an inclined chute-shelf, so that the whole series of bottles may be loaded, washed, or soaked or treated to any desired kind of liquid and then automatically discharged, the attendant for operating the mechanism being only required to control the speed and to stop and start the same. Of course attendants for taking care of the bottles before and after they are introduced into the machine are required. By this means I am enabled to wash a very large number of bottles, filling and emptying the same automatically by the action of the apparatus itself.

My invention is adapted to both pasteurizing, soaking, and rinsing bottles. Any number of tanks for this purpose may be employed, depending upon the number and kinds of solutions into which the bottles are to be filled and emptied, and the apparatus is adapted to a large variety of uses, and I believe I am the first to provide the mechanism for automatically charging and discharging a series of bottles from the bottle-holders upon an endless carrier in a continuous operation, whereby the charging, washing, or pasteurizing and discharging functions are performed simultaneously and automatically by the respective mechanisms and arrangements employed.

Having described my invention, I claim—

1. In a device of the class described, a tank, an endless carrier, means for driving said carrier, bottle-holders fixed to said carrier, a bottle-charging shelf, a bottle-feeder pivoted between said charging-shelf and carrier, and means on the carrier for engaging said feeder whereby it is automatically oscillated to place the bottles in the holders, substantially as specified.

2. In a device of the class described, a tank, an endless carrier, means for driving said carrier, bottle-holders fixed to said carrier, a charging-shelf, a bottle-feeder, and means for actuating the same whereby the bottles are transferred from the feeder into the bottle-holders, substantially as specified.

3. In a device of the class described, a tank, an endless carrier, means for driving said carrier, bottle-holders fixed to said carrier, an inclined bottle-charging shelf, a movable stop at the feeding end, a bottle-feeder between the charging-shelf and carrier, and means on the carrier for actuating said stop and feeder in appropriate time movements for transferring the bottles into the holder, substantially as specified.

4. In a device of the class described, a tank, an endless carrier, means for driving said carrier, bottle-holders fixed to said carrier, adapted to receive the bottles bottom foremost, a lid for each holder adapted when closed to leave the mouths of the bottles open, means for automatically opening and means for automatically closing said lids, a bottle-feeder, and connections between said carrier and feeder adapted to be actuated during the travel of the carrier to transfer the bottles into the holder on the carrier, substantially as specified.

5. In a device of the class described, a tank, an endless carrier, means for rotating said carrier, bottle-holders fixed to said carrier, a lid for each holder, means for closing said lids before the holders enter the bath, means for opening the lids as the holders emerge from the bath, a bottle-charging shelf and a bottle-feeding shelf located between the charging-shelf and carrier, and means on the carrier for vibrating the feeding-shelf in time movements relative to the juxtaposition of the successively-presented bottle-holders, substantially as specified.

6. In a device of the class described, a tank, an endless carrier, means for driving said carrier, bottle-holders fixed to said carrier, adapted to receive the bottles bottom first, retaining devices on the holders adapted to leave the mouths of the bottles open, means for successively actuating said retaining devices as the bottles enter the bath, bottle-feeding mechanism arranged with reference to the direction of travel of the carrier to feed the bottles just before they enter the bath and adapted to be actuated by the carrier in its travel to automatically place the bottles successively in the holders, means for successively releasing the retaining devices as the bottles emerge from the bath, and bottle-discharging mechanism arranged with reference to the direction of travel of the carrier to receive the bottles just after they emerge from the bath and adapted to be actuated by the carrier in its travel to automatically place the bottles successively on a discharging-shelf whereby the bottles are continuously received, washed and discharged by the machine, substantially as specified.

7. In a device of the class described, a tank, an endless carrier, means for driving said carrier, bottle-holders fixed to said carrier, a bottle-feeding mechanism adapted to be actuated by the carrier in its travel to automatically feed the bottles successively to the holders, bottle-discharging mechanism adapted to be actuated by the carrier in its travel to automatically place the bottles successively on a discharging-shelf at the end of the operation, and means attached to each holder adapted to be automatically actuated during the carrier travel to retain the bottles in the holder during their travel from the feeder to the discharger, substantially as specified.

8. In a device of the class described, employing a washing and a rinsing tank, ways forming guides into the washing-tank, from thence into and out of the rinsing-tank, an endless carrier on said ways, means for driving said carrier, bottle-holders fixed to said carrier, stops on the said holders and means actuated by the carrier in its travel for feeding bottles to the holders, substantially as specified.

9. In a device of the class described, a washing and a rinsing tank, ways forming guides into the washing-tank, from thence into and out of the rinsing-tank, an endless carrier on said ways, means for driving said carrier, bottle-holders fixed to said carrier, a hinged lid, a bottle-feeding mechanism in the washing-tank opposite to the entering carrier adapted to be actuated by said carrier to feed the bottles to the holders successively presented by the carrier, a discharging device in the rinsing-tank opposite to the carrier leaving said rinsing-tank, adapted to be actuated by said carrier to discharge the bottles successively presented to it upon a receiver, substantially as specified.

10. In a device of the class described, a tank, an endless carrier, means for driving said carrier, bottle-holders fixed to said carrier, means actuated by the carrier for feeding bottles successively to the holders, inclined guides for the carrier whereby the bottles are received in an inclined position and carried downward into the tank in this position until filled, then inverted, and carried through and out of the tank in this position for washing and draining, and means on each holder for retaining said bottles, substantially as specified.

11. In a device of the class described, a tank, an endless carrier, means for driving the same, bottle-holders fixed to said carrier, means actuated by the carrier for automatically feeding and discharging the bottles to and from said holders, locking devices attached to each holder and means attached to the tank at the feeding and discharging points adapted to respectively engage and release the said locking devices, substantially as specified.

12. In combination with an endless carrier and bottle-holder connected thereto, and provided with hinged lids with locking mechanism, means for closing said lids as the bottles are passed into the liquid, and means for reversing the position and inclination of the bottle-holder within the liquid whereby the bottles are automatically emptied before the endless carrier passes out of the tank, and automatic means for disengaging the lock of the hinged bottom whereby the bottles will slide off of the inclined support outside of the tank, substantially as specified.

13. In a machine of the class described employing a tank containing liquid, an endless carrier and bottle-holder mounted upon said endless carrier, a hinged lid for closing the bottle-holder, locking devices for holding the same in position, an automatic filling device placed in relation to the endless carrier consisting of a swiveling shelf, a tripping mechanism operated by the endless carrier for automatically delivering and discharging of bottles to the holder, and means for holding the hinged lid open until after it has passed the charging devices, substantially as specified.

14. In a machine of the class described employing an endless carrier, a bottle-holder mounted thereon, a hinged lid and locking devices for holding the same in closed position, a discharging device outside of the tank consisting of means for unlocking the hinged lid and opening the same by means of tripping mechanism operated by the endless carrier, substantially as specified.

15. The combination with a tank of an endless carrier, bottle-holders fastened rigidly to said carrier, a stationary bottle-rack mounted at one end above the tank, said bottle-rack having a swiveling holding-plate to prevent the bottle from sliding off, and provided with mechanism adapted to be actuated by the devices on the traveling carrier to vibrate the said holding-plate, an oscillating charging device located between the holders and stationary rack and means for oscillating the said device in proper time movements with the vibrating plate of the rack, substantially as specified.

16. The combination with a tank of an endless carrier, rigidly-attached bottle-holders, a swiveling bottle-rack mounted at the end outside of the tank, adapted to be actuated by hand to convey a plurality of bottles toward the carrier, and means for transmitting the bottles from the rack to the holders successively, substantially as specified.

17. The combination of an endless carrier, rigidly-attached bottle-receptacles, a swiveling lid for each receptacle, lateral projections on each lid, a stationary guide-bar mounted above the tank near said carrier adapted to come in contact with the projections of the lids causing the receptacles to be held open for the reception of bottles, substantially as specified.

18. The combination of an endless carrier, rigidly-attached bottle-receptacles, said receptacles having swiveling lids and lateral projections for said lids, stationary guide-bar mounted at the feeding end of the tank near said carrier and situated to come in contact with the projections of the lids causing the bottle-supporting lids to be held open for the reception of bottles, a lever at the discharging end of the tank adapted to be actuated by the carrier whereby it is thrown into engagement with the said lid projections to unlock the same and release the bottles, substantially as specified.

19. The combination with a tank of an endless carrier, bottle-receptacles rigidly attached to said carrier, a lid for each receptacle, each lid having lateral projections, a swiveling two-end lever mounted at one end sidewise above the tank, said lever operated by the lineal motion of the traveling carrier to bring one end in contact with the lid projections of the bottle-receptacles, to release the bottles, substantially as specified.

20. In a device of the class described, a tank, an endless carrier, means for driving the same, bottle-holders attached to the carrier, a bottle-feeding mechanism actuated by the carrier to automatically place the bottles successively in the holders just before the carrier enters the tank, a bottle-discharging mechanism actuated by the carrier to automatically release the bottles from the holder as they successively emerge from the tank, said tank being interposed between the feeding and discharging devices into which the carrier depends in the line of its travel from the charging to the discharging devices, and mechanisms on the said charging and discharging devices adapted to be actuated by the carrier in its travel, whereby the bottles are continuously and successively received, passed through the tank and discharged, substantially as specified.

21. In a device of the class described, a tank, an endless carrier, means for driving the same, bottle-holders attached to the carrier, bottle-feeding mechanisms adapted to be actuated by the carrier as the carrier enters the tank, bottle-discharging mechanism adapted to be actuated by the carrier as it emerges from the tank, means for automatically retaining the bottles in the holders during the transit in the tank, and guides for the carrier leading from the charging device into and out of the tank to the discharging device whereby the respective devices are simultaneously actuated to perform a single continuous operation, substantially as specified.

In testimony whereof I have hereunto set my hand.

CHARLES C. SCHREIBER.

Witnesses:
OLIVER B. KAISER,
ANTON MILL.